(No Model.)

W. B. TURNER.
REVERSIBLE RATCHET CLUTCH MECHANISM.

No. 465,955. Patented Dec. 29, 1891.

Witnesses.
Fred S. Greenleaf
Edward F. Allen

Inventor.
William B. Turner
by Crosby & Gregory
attys.

UNITED STATES PATENT OFFICE.

WILLIAM B. TURNER, OF BOSTON, MASSACHUSETTS, ASSIGNOR TO THE TURNER-BEARD AUTOMATIC BRAKE COMPANY, OF NEW YORK, N. Y.

REVERSIBLE RATCHET-CLUTCH MECHANISM.

SPECIFICATION forming part of Letters Patent No. 465,955, dated December 29, 1891.

Application filed June 4, 1891. Serial No. 395,040. (No model.)

*To all whom it may concern:*

Be it known that I, WILLIAM B. TURNER, of Boston, county of Suffolk, State of Massachusetts, have invented an Improvement in Reversible Ratchet-Clutch Mechanism, of which the following description, in connection with the accompanying drawings, is a specification, like letters on the drawings representing like parts.

This invention relates to a reversible ratchet-clutch mechanism; and it consists in the combination with a shaft, a pawl-carrying sleeve movable longitudinally thereon and adapted to be rotated therewith, two series of pawls borne by said sleeve and directed in opposite ways, an inclosing shell or case having formed on it interiorly two series of ratchet-teeth for said pawls, and means for moving said pawl-carrying sleeve that the pawls may co-operate with one or the other series, and a suitable cap or equivalent for closing said shell or case to keep the operating parts free from dust and other injurious matter and to protect the same.

Figure 1:
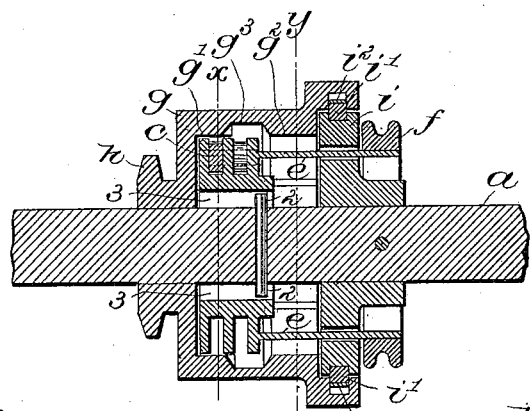
Figure 4:
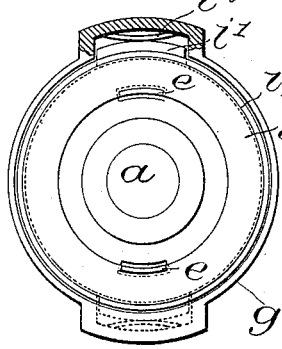
Figure 2:
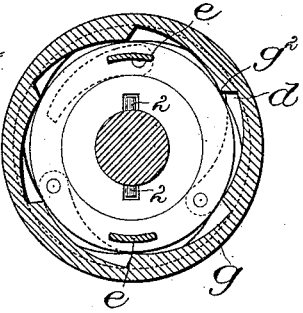
Figure 3:
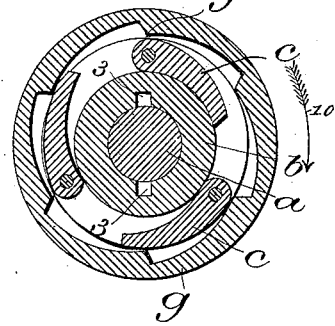
Figure 5:
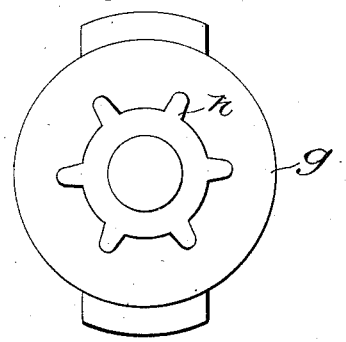

Figure 1 shows a longitudinal section of a ratchet-clutch mechanism embodying this invention; Fig. 2, a cross-section of the clutch mechanism shown in Fig. 1, taken on the dotted line $y\ y$; Fig. 3, a cross-section of the clutch mechanism shown in Fig. 1, taken on the dotted line $x\ x$; Fig. 4, a right-hand end view of the clutch mechanism shown in Fig. 1, partially broken out; and Fig. 5, a left-hand end view of the clutch mechanism shown in Fig. 1.

The shaft $a$ has mounted on it a sleeve $b$, which is made circular and carries two series of pawls, as $c\ d$, herein represented as occupying circumferential grooves in said sleeve. The sleeve $b$ has formed on it interiorly two grooves or passages parallel with the shaft $a$, which receive pins or projections 2, secured to said shaft, such grooves or passages permitting the sleeve to be freely moved longitudinally, and the pins 2, engaging the sleeve, cause it to rotate with the shaft. Arms $e$ connect the sleeve with a circumferentially-grooved ring $f$. The pawl-carrying sleeve $b$, mounted on the shaft $a$, is inclosed in a shell $g$, having formed on its interior two series of oppositely-inclined teeth, as $g'\ g^2$, the said two series being separated by a circumferential groove $g^3$. One end of the inclosing shell $g$ has secured to or formed integral with it a sprocket-wheel $h$, which may receive any suitable form of sprocket-chain. (Not shown.) A cap $i$, having a circumferential groove, is secured to the shaft and is fitted into the other end of the shell $g$, and suitable keys $i'$, held in place in recesses in the shell by springs $i^2$, enter said circumferential groove, and thereby act to hold the shell against longitudinal movement with relation to the shaft, but permit the cap to be rotated independently of the shell. The arms $e\ e$, connecting the sleeve and ring, pass through holes made in the cap $i$. Two series of pawls $c\ d$ are directed in opposite ways, and one series, as $c$, is designed to co-operate with the series of ratchet-teeth $g'$ and the other series, as $d$, is designed to co-operate with the series of ratchet-teeth $g^2$. The sleeve $b$ is moved longitudinally on the shaft $a$, the pin 2 following in grooves 3 in said sleeve and permitting such longitudinal movement, and any suitable device may be provided which engages the circumferentially-grooved ring $f$ for moving said sleeve longitudinally.

When the parts are as shown in Fig. 1, the series of pawls $c$ are in position to engage the series of teeth $g'$ to rotate the shell $g$ as the shaft is revolved in one direction, as designated by the arrow 10; but if the shaft is revolved in the opposite direction the shell would not be rotated with it, and when the sleeve $b$ is moved longitudinally toward the cap $i$ the series of pawls $d$ are in position to engage the series of teeth $g^2$, and thereby revolve the shell $g$ in the opposite direction when the shaft $a$ is turned in the opposite direction, as designated by the arrow 12; but when the sleeve is in such position and the shaft is revolved in the opposite direction the shell $g$ will not be rotated. The cap $i$ prevents the entrance of dust and other injurious matter and protects the operating parts within the shell or case.

I claim—

1. In a reversible ratchet-clutch mechanism, the pawl-carrying sleeve $b$ and pawls $c\ d$, carried by it and directed in opposite ways, as described, combined with an inclosing shell or case having formed on it interiorly two series of oppositely-inclined teeth, as $g'$ $g^2$, and a circumferential groove or space between them, substantially as described.

2. In a reversible ratchet-clutch mechanism, a shaft, a pawl-carrying sleeve movable longitudinally thereon and adapted to be rotated therewith, two series of pawls borne by said sleeve and directed in opposite ways, an inclosing shell or case having formed interiorly on it two series of oppositely-inclined teeth for said pawls, and a circumferential groove or space between them, combined with the circumferentially-grooved cap $i$, secured to the shaft, and keys or equivalent connections entering said groove and connecting the cap with the shell $g$, whereby it may be rotated independently thereof, substantially as described.

In testimony whereof I have signed my name to this specification in the presence of two subscribing witnesses.

WILLIAM B. TURNER.

Witnesses:
BERNICE J. NOYES,
EDWARD F. ALLEN.